(12) United States Patent
West et al.

(10) Patent No.: US 10,245,721 B1
(45) Date of Patent: Apr. 2, 2019

(54) TRUCK ACCESSORY

(71) Applicant: 2546805 Ontario Inc., Timmins (CA)

(72) Inventors: Mark West, Timmins (CA); Richard Dubeau, Timmins (CA); Robert G. Dickie, King City (CA)

(73) Assignee: 2546805 Ontario Inc. (CA)

( * ) Notice: Subject to any disclaimer, the term of this patent is extended or adjusted under 35 U.S.C. 154(b) by 0 days.

(21) Appl. No.: 15/719,842

(22) Filed: Sep. 29, 2017

(51) Int. Cl.
*B25J 1/04* (2006.01)
(52) U.S. Cl.
CPC ........................................ *B25J 1/04* (2013.01)
(58) Field of Classification Search
CPC ............................................................ B25J 1/04
USPC ................. 294/24, 25, 22, 23, 26, 175, 209; 16/422, 426, 430
See application file for complete search history.

(56) References Cited

U.S. PATENT DOCUMENTS

| | | | | |
|---|---|---|---|---|
| 2,824,323 A * | 2/1958 | Oreste | ..................... | A47J 37/06 15/104.04 |
| 3,921,725 A * | 11/1975 | Trutor | ..................... | A01B 1/20 172/374 |
| 5,823,590 A * | 10/1998 | Forrest | ..................... | B25J 1/04 294/104 |
| 5,937,473 A * | 8/1999 | Lisowski | ..................... | B08B 1/00 15/104.05 |
| D427,032 S * | 6/2000 | Holdcroft | ..................... | D8/11 |
| 7,320,489 B1 * | 1/2008 | Domb | ..................... | A63B 47/02 294/104 |
| D574,202 S * | 8/2008 | Rodriguez | ..................... | D8/14 |
| 7,478,851 B2 * | 1/2009 | Geller | ..................... | B25G 1/102 16/413 |
| 8,262,147 B2 * | 9/2012 | Boyum | ..................... | A47F 13/06 294/209 |
| 8,813,414 B2 * | 8/2014 | Jones | ..................... | A01K 97/14 294/175 |
| 8,915,529 B1 * | 12/2014 | Bond | ..................... | B25G 1/04 294/209 |
| 9,227,317 B1 * | 1/2016 | Conley | ..................... | B25H 5/00 |
| D755,025 S * | 5/2016 | Conley | ..................... | D8/14 |

\* cited by examiner

*Primary Examiner* — Paul T Chin
(74) *Attorney, Agent, or Firm* — Sand, Sebolt & Wernow Co., LPA

(57) ABSTRACT

A truck accessory tool includes a handle and a generally planar end plate. The end plate is configured to be positioned adjacent a box or a bag located in a truck bed. The truck accessory tool enables the box or bag to be pulled out of the truck bed by contacting the box or bag while pulling the tool rearwardly. The truck accessory tool additionally enables the box or bag to be pushed into the truck bed by contacting the box or bag while pushing the tool forwardly.

13 Claims, 15 Drawing Sheets

TRUCK ACCESSORY

BACKGROUND

Technical Field

The present disclosure relates generally to an accessory for use with unloading objects from a truck bed. More particularly, the truck accessory tool includes an elongated handle and a generally planar end plate. Specifically, the planar end plate includes an attached hook that collectively enables boxes, bags with straps, and other materials to be unloaded from a truck bed.

Background Information

Conventional half-ton and three-quarter ton pickup trucks are useful inasmuch as they have truck beds configured to haul items therein. Typically, users haul loads of materials that may be stored in boxes or bags. In some scenarios, the boxes are loaded near the front end of the truck bed during transport. Because the length of the truck bed is typically in a range from about six feet to eight feet or more, it is often difficult for a person to unload the boxes of materials when they are positioned near the front of the truck bed. Further, when a tailgate is lowered, the effective length of the truck bed is increased. This makes it difficult for the user to unload the boxes of materials from the truck bed.

SUMMARY

Issues continue to exist with boxes of materials or bags that need to be unloaded from truck beds. Particularly, it is difficult to unload boxes or bags when they are positioned near the forward end of the truck bed. Thus, a need continues to exist for a tool or a truck accessory that makes the unloading of boxes, bags, or other materials from the truck bed easier. The present disclosure addresses these and other issues. More particularly, the present disclosure addresses these issues by providing a truck accessory or tool that has an elongated handle and a generally planar end plate configured to be positioned behind a portion of a box or other material positioned near the forward end of the truck bed. The generally planar end plate allows the operator to pull the materials rearwardly in order to unload them from the truck bed.

In accordance with one aspect of the present disclosure, a truck accessory tool, (i.e., the "TruckBuddy") screws onto the end of a broomstick or telescopic painter's pole (or other handle) for manually adjusting the positioning of cargo in a pickup truck bed. This would spare the truck owner from having to climb upward onto the tailgate and into the bed to directly access and move cargo where required. The device has a pushing/pulling piece and a hooking piece. These pieces face upwards and downwards depending on which is best suited for moving the cargo. In one embodiment, the pushing/pulling piece is a 3½ inch by 5 inch plastic pad or plate. The second part of the working end is a strong metal hook used to securely grab an item. The truck accessory tool is a well designed and engineered tool that will provide for strong pushing and pulling power. It is lightweight, strong, practical and easy to manipulate. Various components are made of strong Nylon and Fiberglass and corrosion resistant steel for years of reliable use. The truck accessory tool will allow the user to easily push items towards the front of the truck bed or pull them to the rear while standing comfortably behind the lowered tailgate. The truck accessory tool will save motorists time and effort. Instead of lowering the tailgate and climbing up in the bed space each time belongings needed to removed, direct access and easy pulling action is available from this tool. Within a matter of seconds the owner can reach and pull a laundry basket, tool box, gas can, sports equipment, coolers, boxes, groceries, etc. from behind the cab. The truck owner will not have to stretch and strain over the bed wall to reach items from the sides. For pickup truck owners with tonneau covers or caps, the truck accessory tool will eliminate the need to crawl or crouch when accessing items from the truck bed. The truck accessory tool allows for the user to access items from truck beds, vans, SUV's and car trunks without having to lean in and rub up against the bumper dirtying their clothes.

In one aspect, an embodiment of the present disclosure may provide a truck accessory comprising: a first end opposite a second end defining a longitudinal direction therebetween; an end plate adjacent the first end; and a handle defining the second end connected to the end plate, wherein the handle length is sized to reach to adjacent a forward end of a truck bed so as to effectuate the removal of one of a box, bag, and bulk material from the truck bed. This embodiment or another embodiment may provide wherein the end plate is sized to be positioned forwardly from the one of the box, bag, and bulk material to pull the one of the box, bag, and bulk material rearwardly while the end plate maintains contact with the one of the box, bag, and bulk material. This embodiment or another embodiment may provide a hook connected to the end plate. This embodiment or another embodiment may provide a collapsed first position of the hook; and an extended second position of the hook, wherein the hook is movable between the first position and the second position. This embodiment or another embodiment may provide a central portion and two linear extensions of the hook defining a U-shaped configuration of the hook. This embodiment or another embodiment may provide a pivot axis, wherein the hook pivots about the pivot axis from the first position to the second position. This embodiment or another embodiment may provide a first lobe extending towards the second end from a major surface of the end plate; and a second lobe extending towards the second end from the major surface, wherein the pivot axis extends transversely through the first lobe and transversely through the second lobe. This embodiment or another embodiment may provide a support member extending from a connection with the end plate, wherein the support member receives the handle therein. This embodiment or another embodiment may provide a first rib connected to the support member and the major surface. This embodiment or another embodiment may provide an additional rib extending from the major surface in an arcuate manner. This embodiment or another embodiment may provide wherein the first lobe defines a transversely aligned bore that is L-shaped in cross-section. This embodiment or another embodiment may provide an extension member on the end plate extending vertically above a curved surface on the first lobe, wherein the extension member is located between the first and second lobes. This embodiment or another embodiment may provide a first tapered edge intermediate the first lobe and the first side, wherein an obtuse angle is formed between the first tapered edge and the first side. This embodiment or another embodiment may provide a lower edge of the end plate; and a lip projecting from adjacent the lower edge, wherein the lip is shaped to orient a major surface of the end plate at an acute angle relative to a floor of the truck bed. This embodiment or another embodiment may provide an annular flange circumscribing a support member configured to receive the handle therein; a first rib extending outwardly from the annular flange towards the first side; and a second rib extending out early from the annular flange towards the second side. This embodiment or another embodiment may provide wherein the first rib and second rib each have an L-shaped configuration with a first leg contacting the support member and a second leg contacting a major surface of the end plate.

In another aspect, an embodiment of the present disclosure may provide a system for effectuating the removal and placement of a box and a bag from a truck bed via an elongated truck accessory tool having a handle, which is lengthwise sized to extend to adjacent a forward end of the truck bed, and having an end plate connected to a forward end of the handle for engaging the end plate with the box so as to enable the box to be pulled rearwardly out of the truck bed when a tailgate is lowered and pushed forwardly to the front of the truck bed, and having a hook connected to the end plate for hooking a strap on the bag so as to enable the bag to be pulled rearwardly out of the truck bed by the strap when the tailgate is lowered. This embodiment or another embodiment may provide wherein the end plate is configured to operate in at least two modes to remove the box from the truck bed, wherein when the end plate is deployed in a first mode a bottom edge on the end plate is position forwardly and adjacent a top edge on the box during the pulling of the box, and wherein when the end plate is deployed in a second mode a side edge on the end plate is positioned forwardly adjacent a side edge in the box during the pulling of the box.

In yet another aspect, an embodiment of the present disclosure may provide a method comprising: positioning an end plate forwardly from an object in a truck bed; pulling the end plate rearwardly while maintaining contact with the object; and moving a hook connected to the end plate from a collapsed first position to an extended second position. This embodiment or another embodiment may provide orienting a major surface of the end plate at an acute angle relative to a floor of the truck bed.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
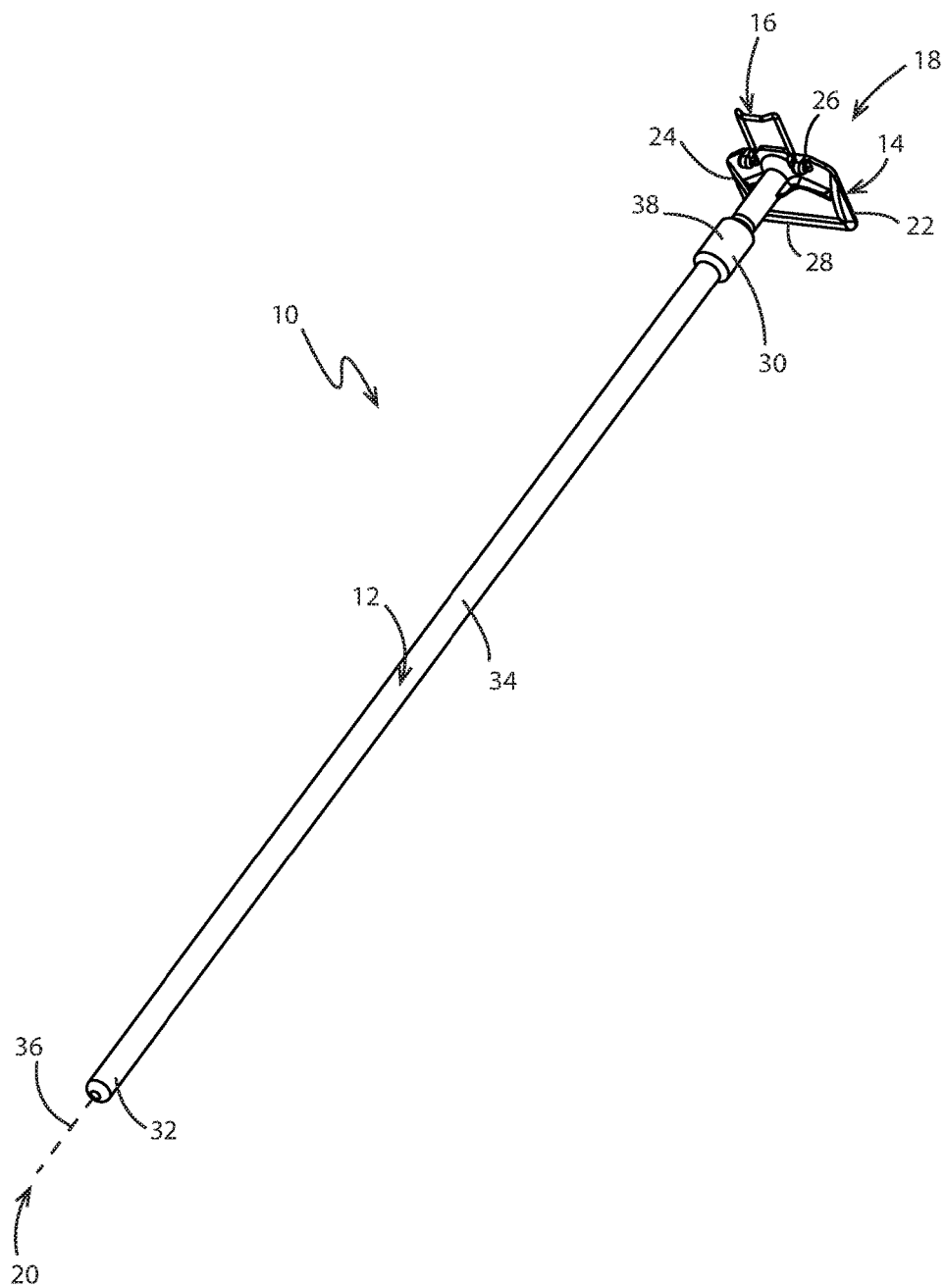
FIG. 1 is a perspective view of a truck accessory in accordance with the present disclosure.

As depicted throughout the figures, a truck accessory is shown generally at 10. Truck accessory 10 includes a handle 12, a generally planar end plate 14, and a hook 16. Accessory 10 includes a first end 18 opposite a second end 20 defining a longitudinal direction therebetween. A first side 22 on the end plate 14 is opposite a second side 24 on the end plate defining a transverse direction therebetween. The accessory 10 includes an upper edge 26 on the end plate 14 opposite a lower edge 28 on the end plate 14 defining a generally vertical direction therebetween.

Handle 12 includes a first end 30 and an opposite second end 32. Second end 32 of handle 12 defines the second end 20 of accessory 10. A generally rigid sidewall 34 extends longitudinally between the first end 30 and the second end 32. In one particular embodiment, the rigid sidewall 34 is formed from a substantially solid material, such as wood (i.e., a broomstick). However, sidewall 34 may equally be formed from a hollow material, such as an aluminum tube. Furthermore, handle 12 may telescope between an elongated position and a shortened position. The length of handle 12 is longitudinally aligned such that the center axis 34 extends axially in the longitudinal direction. The longitudinal length of handle 12 from the first end 30 to the second end 32 may be in a range from about two feet to about ten feet. In one particular embodiment, the length of handle 12 from first end 30 to second end 32 is in a range of about four feet to about eight feet. In another particular embodiment, the length associated with handle 12 from the first end 30 to the second end 32 is substantially similar to the length of a conventional North American one-half ton pickup truck bed. For instance, some pickup trucks have a bed length that is six feet and other pickup trucks have a bed length that is eight feet. Thus, handle 12 may have a length in a range from about six feet to eight feet. In one particular embodiment, handle 12 has a substantially circular cross-section; however, other the cross-sections of the handle 12 are entirely possible. Furthermore, it is envisioned that the cross-sectional configuration of the handle 12 is uniform along a majority of the length thereof. Yet, it is within the scope of the present disclosure to envision a handle 12 that tapers or is shaped in a non-uniform manner such that various aspects and portions of the handle 12 differ from other regions thereof.

Figure 2:
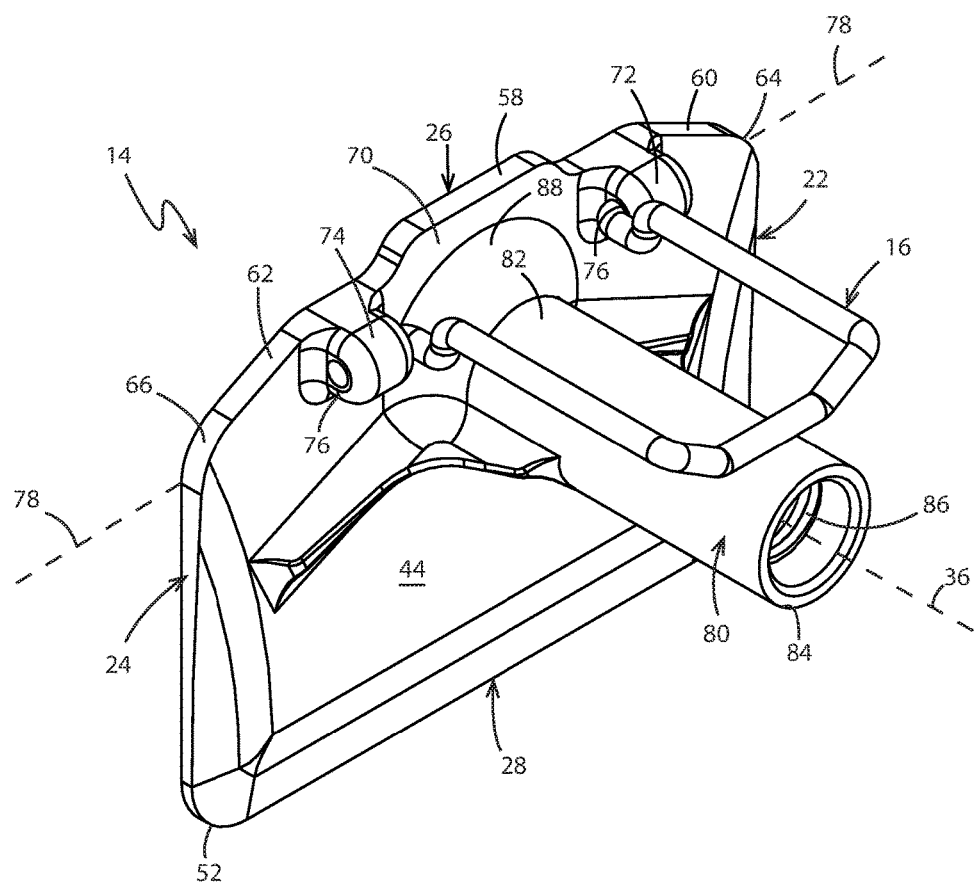
FIG. 2 is a rear perspective view of an end plate and an attached hook in a collapsed first position.

A collar 38 may be provided near or at the first end 30 of the handle 12. The collar 38 may include an enlarged diameter greater than that of the sidewall 34. The collar 38 may be rigidly connected to the sidewall 34. In an alternative embodiment, the collar 38 may be formed from the same material as the sidewall 34 and be cut or formed in a manner such as to effectuate the enlarged circumference and diameter of the collar 38. In accordance with one aspect of the present disclosure, collar 38 is a strengthening collar to support forces applied to the handle 12 by operator when using truck accessory 10 as will be described in greater detail below. Handle 12 further includes a threaded extension 40 (FIG. 6) extending longitudinally outward from the collar 38 to define the first end 30 of handle 12. As will be described in greater detail below, the threaded extension 40 on handle 12 is configured to threadedly mate with receiving threads 86 (FIG. 2) adjacent the generally planar end plate 14. The longitudinal length associated with collar 38 may be in a range from about two inches to about eight inches. The threaded extension 40 may have a longitudinal length in the range from about one inch to about five inches. In one particular embodiment, the length of the threaded extension 40 is equal to the length of the collar 38. The diameter of the threaded extension 40 may be slightly less than the diameter of the sidewall 34 of handle 12. Threads on threaded extension 40 are formed by a helically wound groove extending into the handle 12 near the first end 30. The pitch of the helically wound grooves extend around the longitudinal axis 36 in a manner as one having ordinary skill in the art would understand.

As depicted in FIG. 2, FIG. 3, FIG. 4, FIG. 5, and FIG. 6, the generally planar end plate 14 includes a generally vertically aligned flat and a generally planar first major surface 42 opposite a generally vertical and generally planar second major surface 44. First major surface 42 is bound by the first side 22, the second side 24, the upper edge 26, and the lower edge 28. Similarly, the second major surface 44 is bound by the first side 22, the second side 24, the upper edge 26, and the lower edge 28. End plate 14 has a thickness associated therewith that is longitudinally aligned. Based on the thickness between the first major surface 42 and the second major surface 44, small minor surfaces are created and defined at the respective first and second sides 22, 24 and the respective upper and lower edges 26, 28. The minor surfaces established by the thickness of the end plate are significantly less than the surface area of the major surfaces 42, 44. In one particular embodiment, the surface area of first major surface 42 is at least ten times greater than the combined surface area of the minor surfaces established by the thickness of the end plate 14. In another particular embodiment, the surface area of first major surface 42 is at least 20 times greater than the surface area established by the minor surfaces established by the thickness of end plate 14. In one particular embodiment, the first major surface 42 is substantially continuous and uninterrupted across its entire surface area. However, it is entirely possible for small apertures and other interruptions to exist across the first major surface area 42. One example would be if screws or apertures are needed to attach the generally planar end plate 14 to another device.

Figure 3:
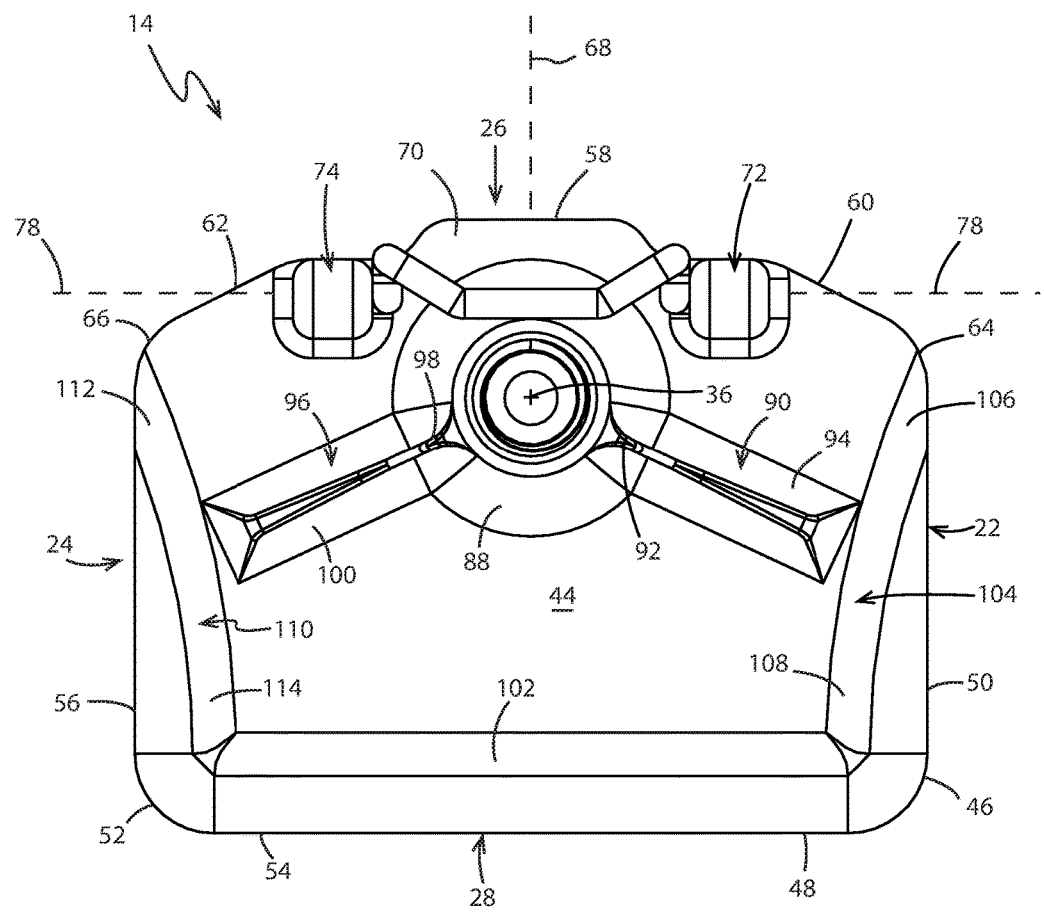
FIG. 3 is a second end elevation view of the end plate and hook.

First side 22 and second side 24 extend substantially parallel to each other. Lower end 28 extends generally orthogonal or perpendicular to first side 22 and second side 24. As depicted in FIG. 3, a first rounded corner 46 may connect a first end 48 of lower edge 28 to a bottom end 50 of first side 22. A second rounded corner 52 may connect a second end 54 of lower edge 28 to a bottom end 56 of second side 24.

Upper edge 26 is divided into three sections. While the three sections referred to herein are for descriptive purposes, it is to be understood that the upper edge 26 is substantially continuous. Upper edge 26 includes a central section 58, an outer first section 60 and an outer second section 62. The terms outer and central as used with respect to the upper edge 26 refer to its proximity to center plane 68. As such, central section 58 is closer to the center plane 68 than the outer first and second sections 60, 62. Outer first section 60 meets first side 22 at a rounded corner 64. Outer second section 62 meets an upper end of second side 24 at a rounded corner 66. The angle defined between outer first section 60 and first side 22 at the corner 64 is an obtuse angle. Similarly, the angle defined between the second side 24 and the outer second edge 62 at corner 66 is an obtuse angle. In one particular embodiment, the angle at corner 64 is equal to the angle at corner 66. Outer first section 60 extends in a non-orthogonal manner inwardly towards central axis 36 from first side 22. Similarly, outer second section 62 extends in a non-orthogonal manner inwardly towards central axis 36 from second side 24. Central section 58 spans across a center plane 68 along which the central axis 36 extends. Central section 58 is intermediate the outer first section 60 and the outer second section 62. In one particular embodiment, the central section 58 of upper edge 26 extends vertically above the top of outer first section 60 and the outer second section 62. Accordingly, central section 58 of upper edge 26 establishes a slight vertical extension member 70 extending upwardly above the top of the outer first section 60 and the outer second section 62. The extension member 70 extends vertically above the top of the outer first and second section 60, 62 a short distance. In one particular embodiment, the vertical distance of extension member 70 is a range of about one-half inch to about one inch. Extension member 70 is formed from the same material forming the first major surface 42.

A first lobe 72 is positioned between the central section 58 and the outer first section 60. A second lobe 74 is positioned between the central section 58 and the outer second section 62. The first lobe 72 and the second lobe 74 extend in a cantilevered manner outwardly from the second major surface 44 adjacent upper edge 26. In one particular embodiment, the first and second lobes 72, 74 are integrally formed with the generally planar edge plate 14. However, it is entirely possible for the lobes, 72, 74 to be formed from different materials or even the same material and be attached via mechanical or chemical means to the second major surface 44. Each lobe 72, 74 defines a transversely aligned bore 76 that is aligned along a pivot axis 78. The diameter of the bore 76 is complementary to a diameter on the hook 16 as will be described in greater detail below. In one particular embodiment, the diameter of the bore 76 in each of the lobes 72, 74 is slightly larger than the diameter of a portion of the hook 16 such that the bores 76 can receive a portion of the hook 16 therethrough in a complementary manner. In one particular embodiment, a free rotation connection is established between the cylindrical sidewalls defining bore 76 on the first lobe 72 and the second lobe 74 and the portions of hooks 16 extending through the bore 76.

In one particular embodiment, pivot axis 78 is located vertically above the first side 22 and the second side 24. In another particular embodiment, the pivot axis 78 is located above corner 64 and located above corner 66. In another particular embodiment, pivot axis 78 is located at least partially above a portion of the outer first section 60 and at least partially above a portion of the outer second section 62. The pivot axis 78 may be located below central section 58 and below the extension member 70. The first lobe 72 may be offset towards the first side 22 relative to central plane 68 and the second lobe 74 may be offset towards the second side 24 relative to central plane 68.

A handle support member 80 extends from a rigid connection with the generally planar end plate 14 in a cantilevered manner from a first end 82 to a terminal second end 84. Support member 80 is concentric about axis 36. Second end 84 defines an opening configured to receive the threaded extension 40 on handle 12 therethrough. Threads 86 are formed in the inner surface of the opening defined by the second end 84 and are complementary to the threads on threaded extension 40 so as to enable the handle 12 to connect to support member 80. In one particular embodiment, second end 84 mateably engages the collar 38 when the handle 12 is threadedly attached to support member 80. In one particular embodiment, support member 80 is integrally formed with end plate 14 during the formation thereof. In another particular embodiment, support member 80 may be formed from a different material and rigidly attached to or adjacent second major surface 44 near the first end 82 of support member 80. In one embodiment, a circular flange 88 circumscribes the outer surface of support member 80 adjacent the first end 82 to strengthen the connection of support member 80 with the end plate 14. More particularly, the circular flange 88 circumscribing the outer surface of support member 80 strengthens the connection of the first end 82 to the second major surface 44. The circular flange 88 circumscribing the support member 80 is located centrally between the first lobe 72 and the second lobe 74. Circular flange 88 is concentric with axis 36.

A first support rib 90 may be generally L-shaped such that a first leg 92 contacts the outer surface of support member 80 offset to the first side 22 of axis 36. First rib 90 may also include a second leg 94 that substantially contacts the second major surface 44 and extends outwardly therefrom in a cantilevered manner. Second leg 94 extends outwardly and downwardly from central plane 68. More particularly, the second leg 94 of first rib 90 is oriented at an angle greater than 90° relative to the central plane 68 such that the second leg 94 is angled downwardly when viewed from second end as best seen in FIG. 3. A second rib 96 is shaped similar to the first rib 90 having a first leg 98 and a second leg 100 that extend outwardly towards the second side 24 in a downward manner similar to that of second leg 94 on first rib 90. The first and second ribs 90, 96 are strengthening ribs configured to support the support member 80 when the handle 12 is threadedly attached thereto along axis 36. In one particular embodiment, the ribs 90, 96 are integrally formed with the end plate 14 such that they are fabricated from a single uniform material. However, it is to be entirely understood and contemplated that ribs 90, 96 may be fabricated from alternative materials so long as they provide adequate structural support to the end plate 14 and the support member 80 when the handle 12 is attached thereto.

With continued reference to FIG. 3, additional support ribs are provided on the end plate 14 and extend outwardly from the second major surface 44. In one particular embodiment, a lower third support rib 102 projects outwardly from the second major surface 44 on end plate 14. Lower third rib 102 is offset substantially parallel to lower edge 28. In one particular embodiment, lower third rib 102 is offset above the lower edge 28 in a range from about one-quarter inch to about two inches. Lower third rib 102 projects outwardly from second major surface 44 substantially in a continuous manner between rounded corner 46 and rounded corner 52. Rib 102 provides structural support to end plate 14 during operational action of truck assembly 10 as will be described in greater detail below. Additionally, rib 102 creates a thickness near the lower edge 28 that is greater than the thickness of other portions of end plate 14 between first surface 42 and second surface 44. More particularly, the region below the lower third support 102 and above the lower edge 28 creates a scraping edge for the end plate 14 when it is in use.

A first side rib 104 extends in a generally arcuate manner from corner 64 to the lower third rib 102. The generally arcuate manner of first side rib 104 is that of a truncated parabolic configuration. First side rib 104 extends outwardly from second major surface 44 and begins at upper end 106 adjacent corner 64 and terminates at lower end 108 at a connection at the lower third rib 102 which is located offset from the rounded corner 46. A second side rib 110 is shaped in a similar truncated parabolic manner such as to arcuately curve from the corner 64 towards the lower edge 28. More particularly, an upper end 112 of second side rib 110 begins at corner 66 and terminates at a lower end 14 connecting with the lower third rib 102 offset from the rounded corner 52. In one particular embodiment, the region between the first side rib 104 and the first side 22 establishes a first scraping edge therebetween. The region between the second side rib 110 and the second side 24 defines a second side scraping edge therebetween. The first and second scraping edges are described in greater detail below with respect to the operation of the truck accessory 10.

The first side rib 104 and the second side rib 110 are integrally formed with the end plate 14 such that the material used to fabricate the same is monolithic between those two portions of the truck accessory 10. However, it is entirely possible that support ribs 104, 112 may be formed from alternative materials and attached to the second major surface 44 in order to extend outwardly therefrom.

As depicted in FIG. 3, the first rib 90 includes an outer terminal end at the end of second leg 94. The terminal end of second leg 94 is positioned inwardly, relative to central plane 68, from the first outer rib 104. Similarly, the terminal end on second leg 100 of second rib 96 terminates short of the second outer rib 110. Additionally, the terminal ends first and second ribs 90, 96 terminate vertically above lower third rib 102.

A transversely aligned width of the end plate 14 is measured between first side 22 and second side 24. In one particular embodiment, the transversely aligned width of the end plate 14 is in a range from about four inches to about 12 inches. In another particular embodiment, the transversely aligned width of the end plate 14 is in a range from about four inches to about eight inches. In one particular embodiment, the width of plate 14 is five inches. As is described in greater detail below, the width of end plate 14 is sized to fit behind a box, or a bag, or other cargo material positioned within a truck bed 140 so as to effectuate the removal of the same by placing the end plate 14 forwardly from the cargo content or box so as to enable the handle 12 to be pulled outwardly from the truck bed 140 and the end plate 14 to pull the cargo outwardly from the truck bed 140 while maintaining constant contact with the same.

Figure 6:
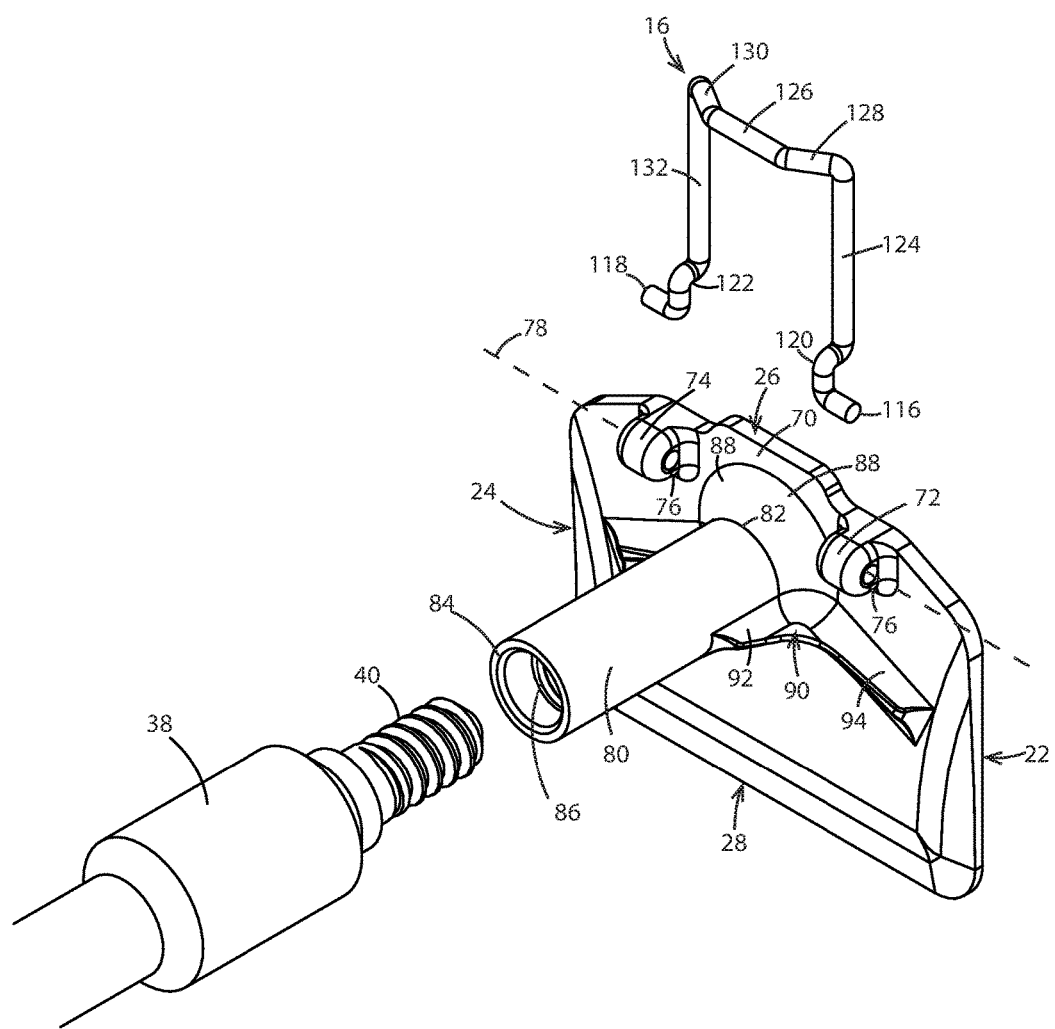
FIG. 6 is an exploded perspective view of the end plate, the hook, and a portion of a handle.

As depicted in FIG. 6, hook 16 includes a first end 116 and second end 118 and define a generally U-shaped member. Stated otherwise, hook 16 has a U-shaped configuration. In one particular embodiment, hook 16 is formed from a uniform material such as a cylindrical wire having a generally uniform cross-section and diameter between the first end 116 and the second end 118. However, it is entirely understood that alternative configurations are entirely possible. The shape of the hook 16 formed by the wire is accomplished by bending portions of the wire or other metal piece as one having ordinary skill in the art would understand. Accordingly, hook 16 includes a first curved portion 120 near the first end 116 and a second curved portion 122 near the second end 118. A first linear extension 124 extends from the curved portion 120 to a central cross-member 126 via a tapered outer section 128. A second tapered outer section 130 connects the central section 126 to another linear extension 132 which is connected with the rounded portion 122 adjacent second end 118. Taper sections 128, 130 are positioned on either side of the central section 126. The tapering of sections 128, 130 offset the central section 126 from the linear portions 124, 132. Accordingly, the central section 126 is offset in a perpendicular manner from the linear extensions 124, 132. Linear extensions 124 is parallel and substantially coplanar with linear extension 132. As such, the tapering angle by sections 128, 130 offset central section 126 from the plane associated with portions 124, 132 by a distance of about one-fourth inch to about one-half inch. The first end 116 of hook 16 is slidably received within bore 76 on first lobe 72. The second end 118 on hook 16 is slidably received through bore 76 in lobe 74. In order to install hook 16 into the respective bore 16, the linear extension portions 124, 132 may be flexibly forced and pressed towards each other so as to narrow the transverse width of the hook 16 at the first and second ends 116, 118. By narrowing the distance between ends 116, 118, the hook is able to flexibly fit between the first lobe 72 and the second lobe 74. The end 116 may be aligned with the bore 76 and the first lobe 72 and the end 118 may be aligned with the bore 76 and the second lobe 74. The forcible flexion of the linear portions 124, 132 may be released so as to effectuate an urging of the first end 16 through the bore 76 in first lobe 72 and urging the second end 118 through the bore 76 in second lobe 74.

Figure 4:
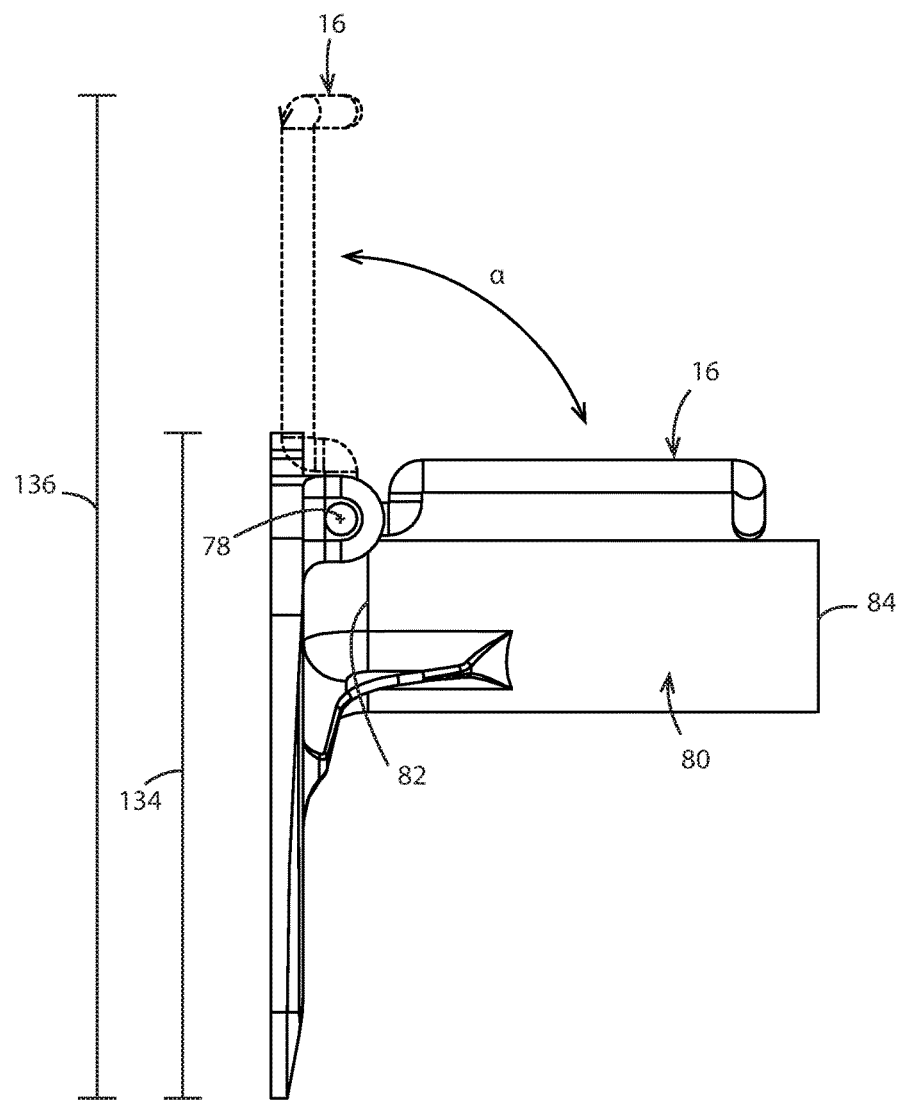
FIG. 4 is a side elevation view of the end plate and hook depicting the hook being movable between the collapsed first position and an extended second position.
Figure 5:
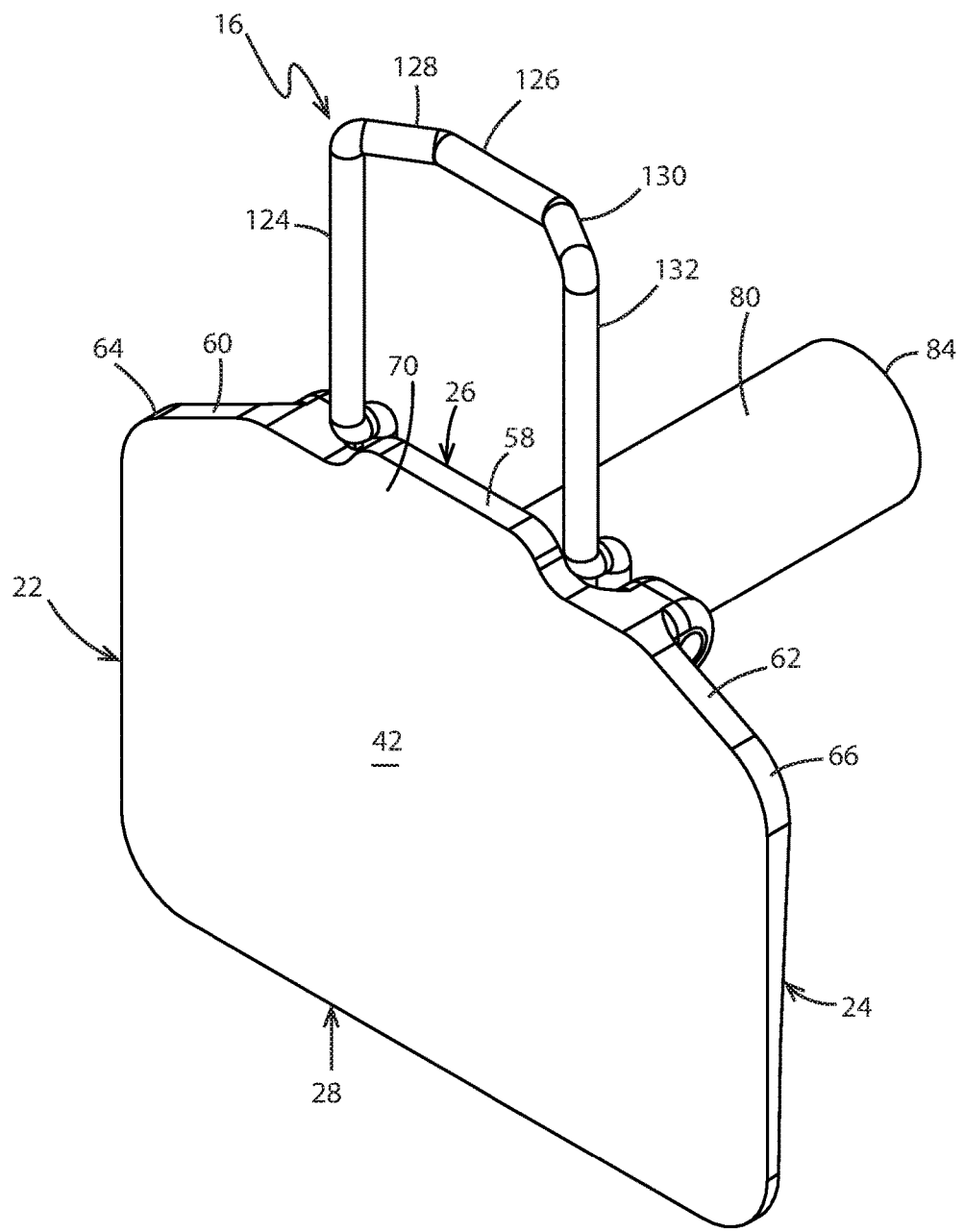
FIG. 5 is a front perspective view of the end plate with the hook in the extended second position.

As depicted in FIG. 4, the hook 16 is movable between a collapsed first position and an extended second position. Hook 16 moves from the collapsed first position to the extended second position by rotating about pivot axis 78 in the direction of arrow A as indicated in FIG. 4. In one particular embodiment, the degrees of travel between the collapsed first position and the extended second position is about 90°. The vertical height 134 of end plate 14 is measured between the upper edge 26 and the lower edge 28. In one particular embodiment, the height 134 of the end plate 14 is in a range of about three inches to about eight inches. In another particular embodiment, the height 134 is three and one-half inches (3W). When the hook 16 is in the collapsed first position, height 134 of the end plate 14 equals the overall height of the truck accessory tool. When the hook 16 is in the extended second position, the height 136 of the second end of the truck accessory 10 is increased due to the extension and 90° rotation of the hook 16 about pivot axis 78. The second height 136 of the second end of truck accessory 10 when the hook 16 is in the extended second portion is a range from about six inches to about 12 inches. Stated otherwise, the height of the second end of the truck accessory 10 increases when the hook 16 is rotated from the collapsed first position to the extended second position. While not shown, it is to be understood that various detents may be formed and defined in portions of the lobes 72, 74 or on portions of the hook 16 so as to effectuate frictional interference locking of the hook 16 in both the collapsed first position and the extended second position. The detents establishing the frictional interference locking may be overcome by forcible urging of an operator when the operator desires to move the hook 16 from one position to another.

Figure 7:
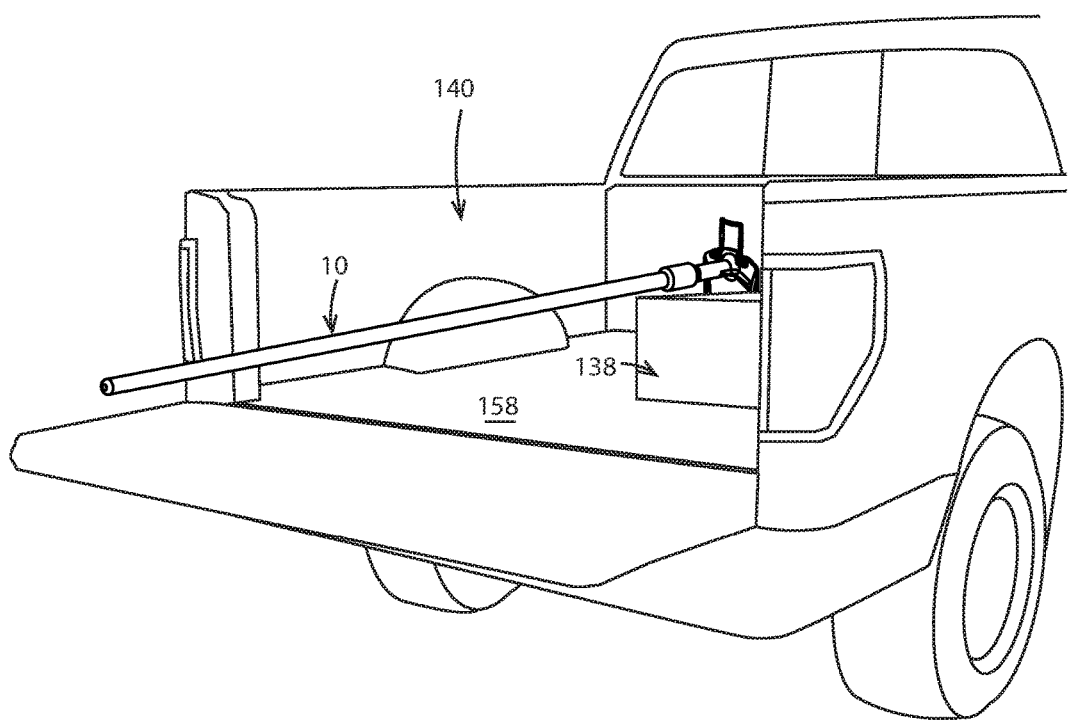
FIG. 7 is a diagrammatic operational view of the truck accessory tool being used to remove cargo, such as a box, from a truck bed.

As depicted in FIG. 7, and in accordance with one aspect of the present disclosure, the truck accessory 10 is a tool that enables various loads, such as boxes 138, to be unloaded from a truck bed 140. For example, the truck bed 140 of a standard American half-ton pickup truck is anywhere in a range from about six feet to about eight feet or even more. Thus, when a box 138 is located forwardly in the truck bed, as shown in FIG. 7, and the tailgate is lowered, it is difficult for a person to remove the box 138 from the truck bed 140 when standing at the rear end of the truck. The truck accessory 10 provides a tool that enables a user to effectuate the removal of the box 138 from the truck bed 140. More particularly, the handle 12 provides a sufficient amount of length for the user to grasp the same and position the end plate 14 forwardly of the box 138 allowing the user to pull the box outwardly (i.e., reward) from the truck bed 140.

Figure 8:
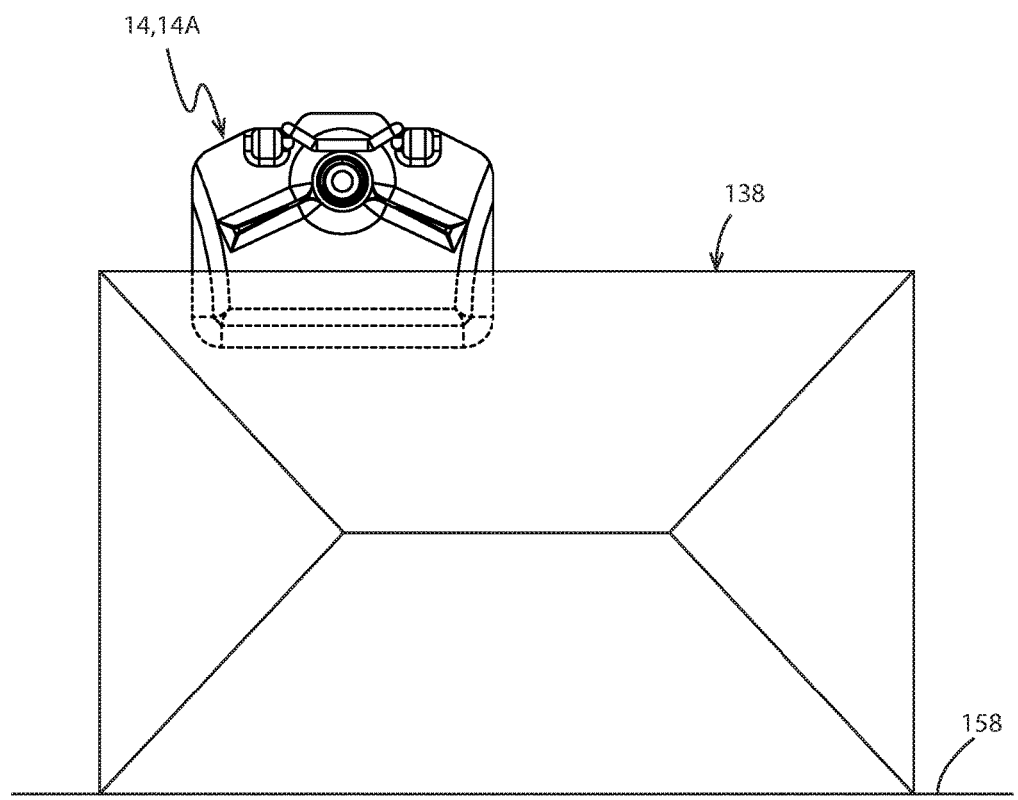
FIG. 8 is an operational end view of the truck accessory tool being positioned behind a portion of a box.
Figure 9:
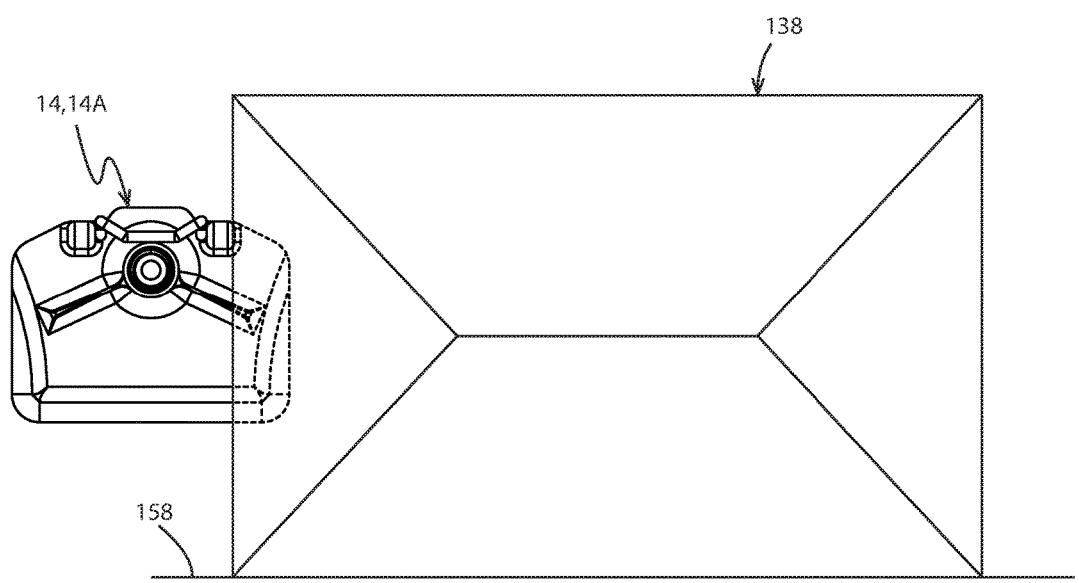
FIG. 9 is an operational end view of the truck accessory tool being position behind another portion of a box.

As depicted in FIG. 8 and FIG. 9, the end plate 14 enables the operator to position portions of the lower edge 28 or the side edges 22, 24 behind the box 138 to be unloaded. The edges that contact the box encourage and engage the box 138 in a manner that enables the end plate 14 to remain engaged and in constant contact with the box 138 while the box 138 is being pulled outwardly from the truck bed 140 via handle 12. More particularly, inasmuch as FIG. 8 and FIG. 9 are end views of the box 138, the dash line portions of the truck accessory tool 10 shown in FIG. 8 and FIG. 9 are shown to represent their existence behind the forward portion of the box 138 that is associated most forwardly with the truck bed 140.

Figure 10:
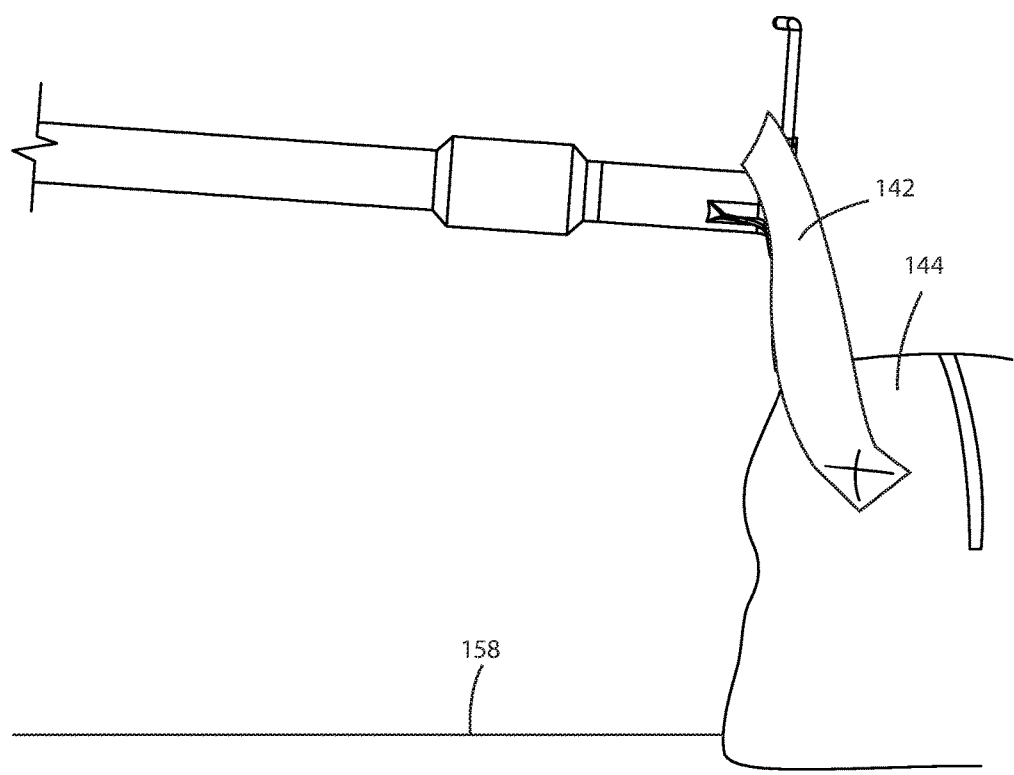
FIG. 10 is a diagrammatic side view of the operation of the truck accessory tool being used to pull a bag having a strap via the hook.

FIG. 10 depicts the hook 16 as utilized in instances where the load inside the truck bed includes a loop strap 142. Strap 142 also includes a first end and a second end fixedly connected to a bag 144 loaded in truck bed 140. The looped strap 142 enables and defines an aperture for a portion of the first end of the truck accessory to pass therethrough such that the hook 16 hooks the loop strap 142 and the bag 144 may be pulled outwardly from the truck bed 140. In this embodiment, the tapered sections 128, 130 on the hook 16 which offset the central section 126 rearwardly from the vertical sections 124, 132 and creates an approximate 90° angle to prevent the loop strap 142 from slipping over the hook 16 during the pulling movement of the bag 144 outwardly from the truck bed 140.

Figure 11:
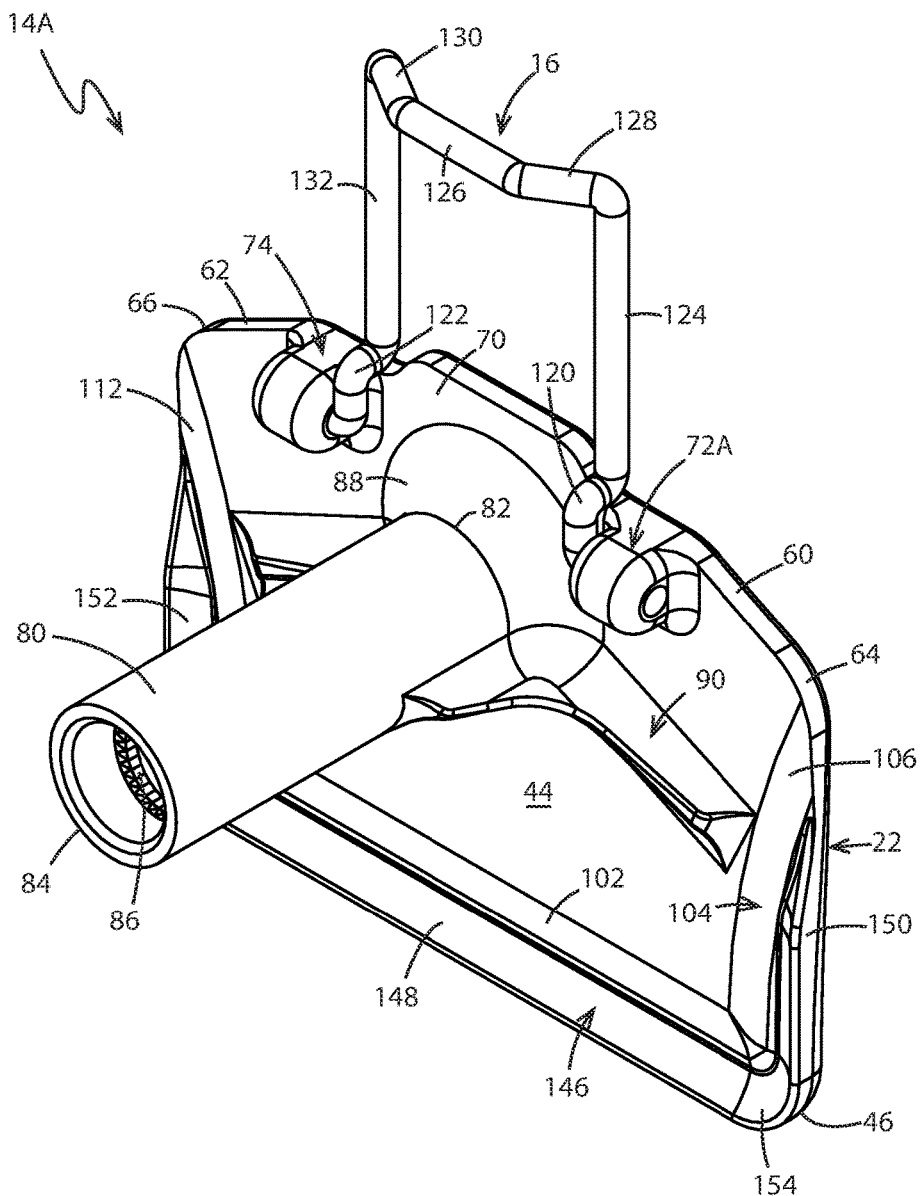
FIG. 11 is a rear perspective view of an end plate in accordance with a second embodiment of the present disclosure.
Figure 12:
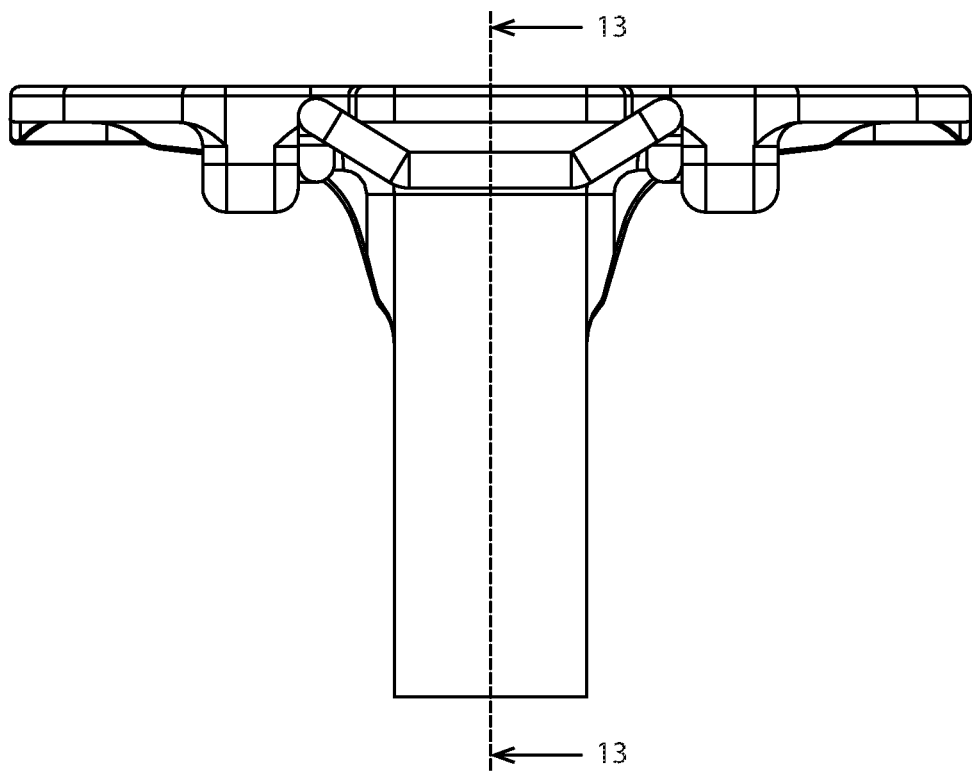
FIG. 12 is a top plane view of the end plate in accordance with the second embodiment of the present disclosure.

FIG. 11 depicts an alternative embodiment of a generally planar end plate at 14A. End plate 14A includes some similar components as end plate 14, wherein similar reference elements are denoted with similar reference numerals. End plate 14A includes a U-shaped lip 146 projecting rearwardly from the second major surface 44. Lip 146 is generally U-shaped including a lower center portion 148 that extends rearwardly in a cantilevered manner from lower edge 28. Lip 146 includes a first leg extending rearwardly from the first side 22. First leg 150 is opposite and spaced parallel from a second leg 152 that extends rearwardly from the second side 24. First and second legs 150, 152 extend upwardly from rounded connections with the center portion 148 of the lower lip 146. The lip 146 further includes a first rounded corner 154 extending rearwardly from the rounded corner 46 and a second rounded corner 156 (FIG. 14) extending rearwardly from the second rounded corner 52. Collectively, these elements of the lower lip 146 enable the lip to project rearwardly from the second major surface 44 so as to effectuate and enable a better scraping action of the end plate 14 when the truck accessory 10 is being utilized in the truck bed 140. More particularly, the lower lip 146 enables the end plate 14A to contact the floor 158 of truck bed 140.

Figure 13:
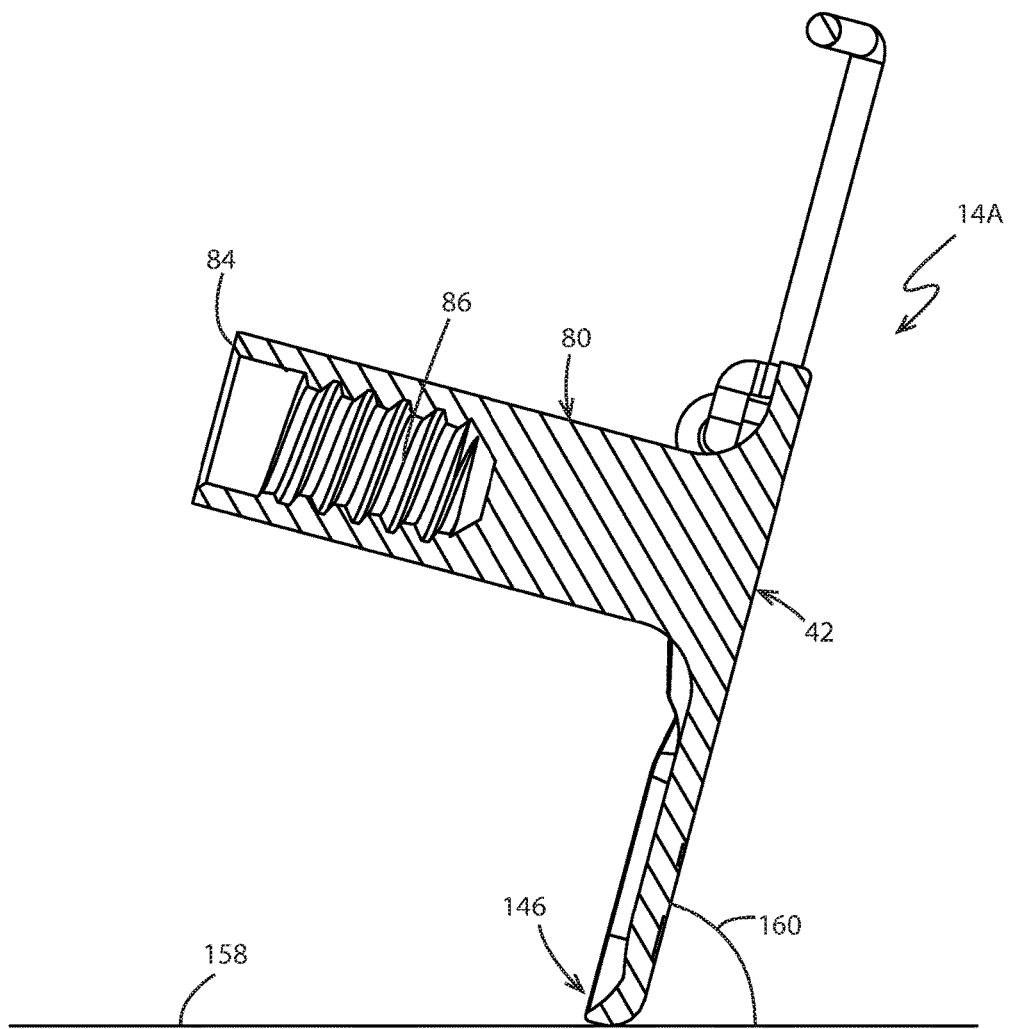
FIG. 13 is a cross-section of the end plate in accordance with the second embodiment of the present disclosure taken along line 13-13 in FIG. 12.

FIG. 13 depicts the integral formation between the support 80 and the planar portion of end plate 14A. A similar integral connection is also provided between support 80 and the planar portion of end plate 14. In one particular embodiment, it is envisioned that the end plates 14, 14A are integrally formed via an injection molding process with support member 80 as one having ordinary skill in the art would understand. It is additionally seen that the interior threads 86 within support member 80 are complimentary to the extension threads 40 on handle 12.

With continued reference to FIG. 13, the operational alignment of end plate 14A relative to the floor 158 of truck bed 140 is angled relative to vertical. More particularly, the lower lip 146 on end plate 14A positions the first major surface 42 at an acute angle 160 relative to the floor 158 of truck bed 140. In one particular embodiment, angle 160 is in a range from about 45° to about 89°. In another particular embodiment, the acute angle 160 is in a range from about 50° to about 85°. In another particular embodiment, the acute angle 160 is in a range from about 60° to about 80°. In one particular embodiment, the acute angle 160 between the first major surface 42 and the floor 158 of the truck bed 140 based on the configuration of lower lip 146 is 70°. In one non-limiting example, the ranges of the acute angle 160 defined between the first major surface 42 and the floor 158 of the truck bed during the operation of the truck accessory 10 may be critical so as to effectuate a proper scraping action of the lower lip 146. However, it is to be entirely understood that this example is not intended to be limiting or to be a complete explanation of each and every purpose of the acute angle 160. Further, other acute angles are entirely possible. Alternatively, it would be possible for the angle to be an obtuse angle when the lower lip has a different configuration or if the lower lip is removed, such as in a version of end plate 14 depicted in FIGS. 1-10.

Figure 14:
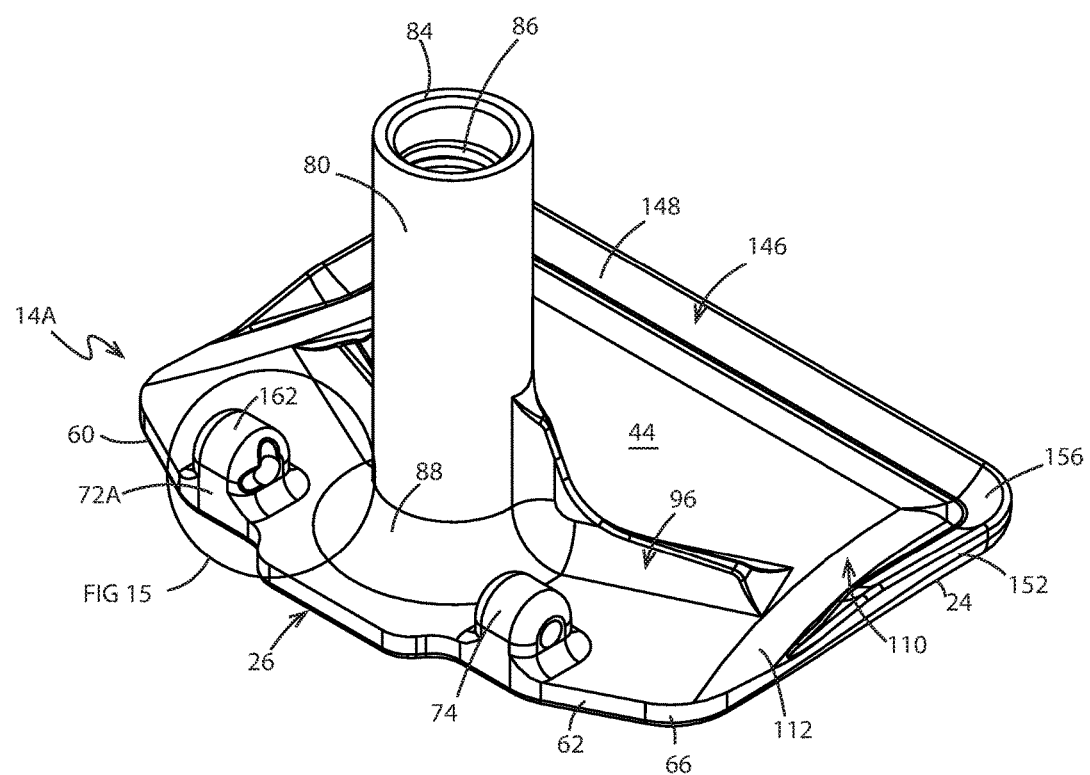
FIG. 14 is a perspective view depicting a lobe having an alternative configuration.
Figure 15:
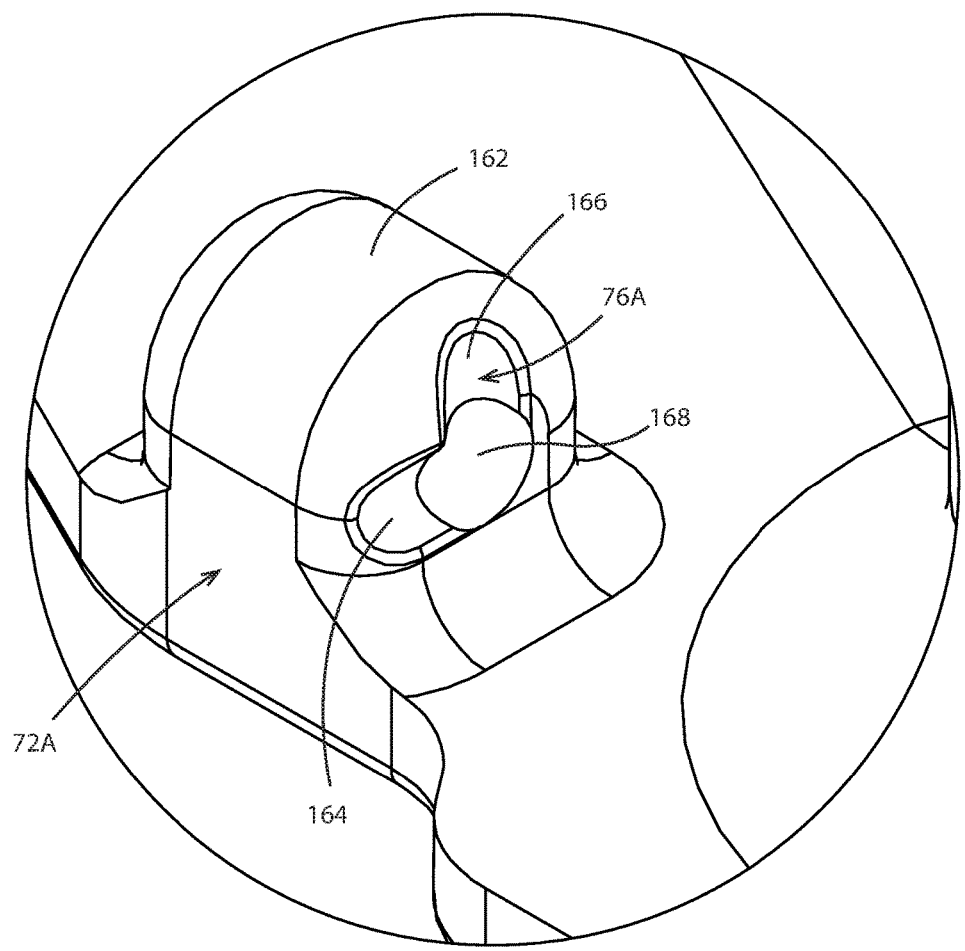
FIG. 15 is an enlarged perspective view of the alternative lobe depicted in the region labeled "See FIG. 15" in FIG. 14.

As depicted in FIG. 14 and FIG. 15, end plate 14A may further include a first lobe 72A that extends in a cantilevered manner away from the second major surface 44 adjacent the top edge 26. First lobe 72 may include a rounded end wall 162 that is semicircular in form. Lobe 72A additionally includes transversely aligned bore 76A that is L-shaped in cross-section. Stated otherwise, the bore 76A is not circular in cross-section as bore 76 as described in the previous embodiment. Bore 76A that is L-shaped in cross-section and has a first leg 164 and a second leg 166. First leg 164 of bore 76A extends transversely in a general vertical manner. Second leg 166 extends transversely through lobe 72A in a generally longitudinal manner. In one particular embodiment, first leg 164 is oriented approximately orthogonally to second leg 166 of bore 76A. The L-shaped alignment of bore 76A enables either a slider 168 or one of the ends of the hook 16 to slidably move transition from the first leg 164 to the second leg 166 and vice versa as the hook 16 is moving from the collapsed first position to the extended second position.

In one particular embodiment, one of the ends of hook 116 is slidably received in slider 168 which acts as a collar to frictionally interfere with the sidewalls defining bore 76A. Thus, the first leg 164 and the second leg 166 of lobe 72A act as the detents in order to lock the hook 16 in the respective first and second positions.

Further, while primary reference is made herein to tool or accessory 10 that assists with the removal of contents from truck bed 140, the accessory 10 may additionally be used to load cargo into bed 140. For example, plates 14, 14A can be used to push contents forwardly into truck bed 140 when it is necessary to load materials near the front thereof. Often, it is safer for contents to be placed forwardly in the bed to keep them more secure.

In accordance with another aspect of the present disclosure, it is to be understood that tool 10 may be deployed in an inverted manner to accomplish a similar pushing and pulling motion of objects through the truck bed. For example, tool 10 may be inverted such that hook 16 engages the floor 158 of truck bed 14. The hook may then be pulled rearwardly while engaging an object to remove the same from the truck bed.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of preforming the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:
1. A truck accessory comprising:
   a first end opposite a second end defining a longitudinal direction therebetween;
   an end plate adjacent the first end of the truck accessory;
   a handle defining the second end of the truck accessory and the handle is connected to the end plate, wherein the handle length is sized to reach to adjacent a forward end of a truck bed so as to effectuate the removal of one of a box, bag, and bulk material from the truck bed;
   a hook connected to the end plate having a collapsed first position of the hook and an extended second position of the hook, wherein the hook is movable between the first position and the second position, and the hook including a central portion and two linear extensions of the hook defining a U-shaped configuration of the hook;
   a pivot axis, wherein the hook pivots about the pivot axis from the first position to the second position;
   a first lobe extending towards the second end from a major surface of the end plate; and
   a second lobe extending towards the second end from the major surface, wherein the pivot axis extends transversely through the first lobe and transversely through the second lobe.

2. The truck accessory of claim 1, wherein the end plate is sized to be positioned forwardly from the one of the box, bag, and bulk material to pull the one of the box, bag, and bulk material rearwardly while the end plate maintains contact with the one of the box, bag, and bulk material.

3. The truck accessory of claim 1, further comprising:
   a support member extending from a connection with the end plate, wherein the support member receives the handle therein.

4. The truck accessory of claim 3, further comprising a first rib connected to the support member and the major surface.

5. The truck accessory of claim 4, further comprising an additional rib extending from the major surface in an arcuate manner.

6. The truck accessory of claim 1, wherein the first lobe defines a transversely aligned bore that is L-shaped in cross-section.

7. The truck accessory of claim 1, further comprising:
an extension member on the end plate extending vertically above a curved surface on the first lobe, wherein the extension member is located between the first and second lobes.

8. The truck accessory of claim 7, further comprising:
a first tapered edge intermediate the first lobe and the first side, wherein an obtuse angle is formed between the first tapered edge and the first side.

9. The truck accessory of claim 1, further comprising:
a lower edge of the end plate; and
a lip projecting from adjacent the lower edge, wherein the lip is shaped to orient a major surface of the end plate at an acute angle relative to a floor of the truck bed.

10. The truck accessory of claim 1, further comprising:
an annular flange circumscribing a support member configured to receive the handle therein;
a first rib extending outwardly from the annular flange towards the first side; and
a second rib extending out early from the annular flange towards the second side.

11. The truck accessory of claim 10, further comprising wherein the first rib and second rib each have an L-shaped configuration with a first leg contacting the support member and a second leg contacting a major surface of the end plate.

12. A system for effectuating the removal and placement of a box and a bag from a truck bed via an elongated truck accessory tool having a handle, which is lengthwise sized to extend to adjacent a forward end of the truck bed, and having an end plate connected to a forward end of the handle for engaging the end plate with the box so as to enable the box to be pulled rearwardly out of the truck bed when a tailgate is lowered and pushed forwardly to the front of the truck bed, and having a hook connected to the end plate for hooking a strap on the bag so as to enable the bag to be pulled rearwardly out of the truck bed by the strap when the tailgate is lowered, wherein the hook is movable about a pivot axis between a collapsed first position and an extended second position and the pivot axis is parallel to the end plate.

13. The system of claim 12, wherein the end plate is configured to operate in at least two modes to remove the box from the truck bed, wherein when the end plate is deployed in a first mode a bottom edge on the end plate is position forwardly and adjacent a top edge on the box during the pulling of the box, and wherein when the end plate is deployed in a second mode a side edge on the end plate is positioned forwardly adjacent a side edge in the box during the pulling of the box.

* * * * *